United States Patent
Duncan et al.

[15] 3,665,708
[45] May 30, 1972

[54] GAS GENERATION PROCESS USING METAL CARBONYLS AS ADDITIVES

[72] Inventors: William A. Duncan; James A. Murfree, Jr., both of Huntsville, Ala.

[73] Assignee: The United States of America as represented by the Secretary of the Army

[22] Filed: Oct. 1, 1969

[21] Appl. No.: 863,757

[52] U.S. Cl..................60/220, 60/214, 60/219, 149/36
[51] Int. Cl. .......................................C06d 5/10
[58] Field of Search ...............60/218, 219, 215; 149/36

[56] References Cited

UNITED STATES PATENTS

| | | | |
|---|---|---|---|
| 2,925,709 | 2/1960 | Mantell et al. | 149/36 X |
| 2,930,184 | 3/1960 | Plescia et al. | 149/36 X |
| 3,021,667 | 2/1962 | Griffin et al. | 149/36 X |
| 3,086,945 | 4/1963 | Cohn | 252/372 |
| 3,165,382 | 1/1965 | Forte | 60/218 |
| 3,331,203 | 7/1967 | Kaufman et al. | 60/220 |

*Primary Examiner*—Benjamin R. Padgett
*Attorney*—Harry M. Saragovitz, Edward J. Kelly, Herbert Berl and James T. Deaton

[57] ABSTRACT

Metal carbonyls are utilized with an oxidizer and a monopropellant of the hydrazine type in a process of gas generation to obtain instantaneous ignition, to obtain very vigorous combustion of the monopropellant, and to increase the startability of the gas generator once it has cooled down from being shut off.

5 Claims, No Drawings

GAS GENERATION PROCESS USING METAL CARBONYLS AS ADDITIVES

CROSS REFERENCE TO RELATED APPLICATION

This application is related to gas generators of the type disclosed in copending application Ser. No. 651,654, filed July 5, 1967.

BACKGROUND OF THE INVENTION

In the past, gas generators involving the thermal decomposition of an exothermic monopropellant such as hydrazine have been developed. These gas generators are known as the "chemi-thermo" gas generators, and they have a porous bed or support such as firebrick or various corrugated ceramics with a chemical initiator therein. These chemicals depend on a hypergolic reaction between the monopropellant and a chemical initiator such as iodic acid or potassium permanganate to heat the bed to a temperature at which the monopropellant will sustain thermal decomposition on the hot surface after the initiator has been consumed. Various techniques have been developed to incorporate the initiator into the bed so that efficient heating of the bed is achieved. In this connection, note copending application Ser. No. 651,654, filed July 5, 1967. In these type gas generators the restartability of the gas generator depends upon the temperature of the bed. That is, after the bed has cooled down below a predetermined temperature, the heat of the bed is insufficient to cause thermal decomposition of the monopropellant. Therefore, there is a need for a gas generator that can be restarted after the bed has cooled down to practically room temperature.

Accordingly, an object of this invention is to provide a gas generator that can be restarted after the bed has cooled down to practically room temperature.

Another object of this invention is to provide a gas generator that has instantaneous ignition.

A further object of this invention is to utilize a metal carbonyl that is deposited as a catalyst on the bed during the initial starting of the gas generator.

A still further object of this invention is to provide a gas generator in which the monopropellant has vigorous combustion.

SUMMARY OF THE INVENTION

A gas generator is provided by loading an inert bed or support material with an oxidizer such as iodic acid or potassium permanganate and with a metal carbonyl compound that has one or more molecules of carbon monoxide. A monopropellant of the hydrazine type is brought into contact with the oxidizer and the metal carbonyl to cause instantaneous ignition and the production of gases. During the initial combustion, metal and/or metal oxides from the metal carbonyls are deposited as a film on the inert bed or support to form a catalyst for the monopropellant. Once the gas generator has been stopped and allowed to cool down, the deposited metals and/or metal oxides act as catalysts for the monopropellant to cause thermal decomposition. Thus, the gas generator can be restarted as many times as desired.

DETAILED DESCRIPTION OF THE INVENTION

This invention concerns the use of a class of compounds known as metal carbonyls as additives to a "chemi-thermo" gas generator. This gas generator concept involves the thermal decomposition of an exothermic monopropellant such as hydrazine, monomethyl hydrazine and mixtures thereof on a porous bed or support such as insulating firebrick or various corrugated ceramics. This scheme depends on a hypergolic reaction between the monopropellant and a chemical initiator such as iodic acid ($HIO_3$) iodic acid anhydride ($I_2O_5$) or potassium permanganate ($KMnO_4$) to heat the bed to a temperature at which the propellant will sustain thermal decomposition on the hot surface after the initiator has been consumed. Various techniques have been developed to incorporate the initiator into the bed so that efficient heating of the bed is achieved. Various ones of these techniques are disclosed in copending application Ser. No. 651,654.

The metal carbonyls are incorporated in the inert bed or support in the same manner as the chemical initiator. The bed or support may be any inert support material with sufficient porosity to allow the incorporation of the oxidizer and metal carbonyl and with properties such that the high temperatures encountered can be tolerated. Firebrick with a porosity of from 50 to 80 percent works well with this invention, and also zircon mullite corregated ceramics with a wall porosity of from 25 to 30 percent work well with this invention. If the corregated ceramics with a wall porosity of from 25 to 30 percent work well with this invention. If the corregated ceramic is used, a plurality of layers or turns are used so that the overall porosity of the structure is about 60 to 90 percent.

The metal carbonyls are generally reactive compounds consisting of one or more molecules of carbon monoxide (CO) loosely bound to one or more metal atoms. Typical examples are manganese carbonyl $[Mn_2(CO)_{10}]$ and chromium carbonyl $[Cr(CO)_6]$. Compounds which react well with hydrazine are triiron dodecacarbonyl $[Fe_3(CO)_{12}]$ and diiron nonacarbonyl $[Fe_2(CO)]$, the former appearing more reactive. Addition of hydrazine to a mixture of $Fe_3(CO)_{12}$ and $HIO_3$ results in instantaneous ignition and very vigorous combustion, leaving a solid residue of iron and/or iron oxide. Subsequent additions of hydrazine to this residue after varying lengths of cool-down time results in the iron heating to a red glow and then ignition of the hydrazine. This result occurs practically down to room temperature.

Thus, the useful effect of the metal carbonyls as gas generator additives is three-fold as follows:

1. Being a reactive class of compounds, the metal carbonyls, upon decomposition, add a significant amount of heat during the initiating reaction of a "chemi-thermo" gas generator.

2. Boost the initial amount of gas generated by the liberation of carbon monoxide during the decomposition of the metal carbonyl additive. (In the presence of air or an oxidizing agent such as the $HIO_3$ initiator, the carbon monoxide thus liberated undergoes combustion to produce more heat and yield an inert gaseous product, carbon dioxide.)

3. Leave a deposit of metal on the surface of the bed or support material which then promotes catalytic decomposition of hydrazine and ammonia.

We claim:

1. The process of gas generation comprising: bringing a liquid monopropellant selected from the group consisting of hydrazine, monomethyl hydrazine and mixtures thereof into contact with a mixture of an oxidizer for said monopropellant and a metal carbonyl compound to cause instantaneous ignition and combustion of said monopropellant, said oxidizer and metal carbonyl compound being supported in an inert porous support material, and said metal carbonyl compound being selected from the group consisting of manganese carbonyl, chromium carbonyl, triiron dodecacarbonyl and diiron nonacarbonyl.

2. The process of claim 1 wherein said oxidizer is selected from the group consisting of iodic acid, iodic acid anhydride and potassium permanganate.

3. The process of claim 2, wherein said metal carbonyl compound is triiron dodecacarbonyl.

4. The process of claim 3, wherein said oxidizer is iodic acid.

5. The process of claim 1, wherein said oxidizer is iodic acid and said metal carbonyl is diiron nonacarbonyl.

* * * * *